(12) United States Patent
Leidich

(10) Patent No.: US 6,694,445 B1
(45) Date of Patent: Feb. 17, 2004

(54) RELIABLE READING OF MULTIPLE TIME ELEMENTS FROM REAL-TIME CLOCK DURING UPDATE AND NON-UPDATE PERIODS

(75) Inventor: Russell M. Leidich, Mountain View, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 09/480,952

(22) Filed: Jan. 11, 2000

(51) Int. Cl.[7] ................................................. G06F 1/14
(52) U.S. Cl. ....................................................... 713/502
(58) Field of Search ........................... 713/502; 710/260

(56) References Cited

U.S. PATENT DOCUMENTS 5,418,936 A * 5/1995 Rodriguez et al. .......... 713/501
5,606,680 A * 2/1997 Parvereshi et al. ......... 711/200
6,154,805 A * 11/2000 Parvereshi et al. ............ 711/2
6,247,137 B1 * 6/2001 Wickeraad ................... 713/401
6,400,785 B1 * 6/2002 Sunaga et al. ............... 375/372

FOREIGN PATENT DOCUMENTS

GB          63242 A2 * 10/1982  ......... H03K/13/258

\* cited by examiner

*Primary Examiner*—Thomas Lee
*Assistant Examiner*—Eric Chang

(57) ABSTRACT

A program segment of a BIOS programs a PC processor to reliably read one or more time elements from a real-time clock (RTC) during a stable read window of a period during which an update in progress (UIP) bit from the RTC is not set.

39 Claims, 2 Drawing Sheets

RELIABLE READING OF MULTIPLE TIME ELEMENTS FROM REAL-TIME CLOCK DURING UPDATE AND NON-UPDATE PERIODS

TECHNICAL FIELD OF THE INVENTION

The present invention is related in general to basic input/output systems (BIOS) for personal computers, and more particularly concerns a method and apparatus for reliably reading time elements from a real-time clock chip or component.

BACKGROUND OF THE INVENTION

In firmware design, it is often critical to read the time or date with certainty, as the read time or date may control sensitive financial or physical operations. To read the time or date with such certainty, certain timing deadlines must be met. Many conventional computer and controller systems ignore these deadlines.

If not critical, it is at least useful to reuse code in order to save both read-only and random access memory space. It is also important to maintain as much conceptual separation between computer hardware and computer software as possible, such that one can be changed with only a minimal effect on the other.

In the basic input/output system (BIOS) of a personal computer (PC), there is generally a routine which will read the value from a hardware component called a real-time clock or RTC. The RTC puts out several time-related values, such as seconds, minutes, hours, date and year. It would be useful to use a single program to read multiple ones of these values instead of serially using several such programs, which takes more time and processing resources and uses more memory space.

A problem associated with using a single routine for reading multiple values from the RTC which comprise a time stamp is that, because of its dynamic nature, the clock could advance between calls to the common routine. Another problem is created by attempts to read the RTC while it is in the process of updating, which may result in the delivery of meaningless data.

Conventional PC RTCs are compatible with an original MOTOROLA RTC architecture. The conventional methodology used in reading MOTOROLA RTC-compatible RTCs is to write straight-line, monolithic code which reads or write the entire time, date, and time and date, which wastes space and increases software's dependence on hardware. This code is optimized for speed inline, but makes no attempt to ensure that events beyond the control of the CPU do not occur in the middle, which could result in exceeding the permissible timing window for these read operations before the next update cycle begins. In conventional practice, specific code must be written for every combination of RTC time/date registers desired to be accessed, due to the timing constraints which force designers to write inline code and not to call out to preexisting routines. There is also no way of knowing whether unpredictable or undetectable events in the system fabric, such as system management interrupts (SMIs) or bus stalls, have caused the execution of the monolithic code to exceed a critical timing threshold. The code could therefore unknowingly deliver incorrect results. It would therefore be beneficial to devise a method and apparatus for reading a single RTC register at a time, while yet guaranteeing the return of a complete and accurate time/date, essentially free from errors caused by exceeding RTC read windows.

SUMMARY OF THE INVENTION

According to one aspect of the invention, a system, programmable medium and method are provided for reliably reading a plurality of different time elements from a clock. The clock, of which an RTC is an example, updates one or more of the time elements at the end of each of a plurality of time periods. Each time period has a nonupdate period during which the time elements are not being changed, and an update period during which the clock is updating the time elements. The clock generates an update in progress (UIP) signal for the duration of each update period. Each such update period has read window during which the time elements may be stably read. A processor coupled to the clock periodically reads the UIP signal and the time elements. The processor is programmed with a read time program which permits the reading of the time elements during the nonupdate period and the read window portion, but which does not permit the reading of time elements during that portion of the update period not falling within the read window portion.

According to another aspect of the invention, a system, programmed medium and method are usable in connection with a clock which updates a plurality of time elements once during each of a plurality of time periods. Each time period has an update period during which the clock is updating the time elements and a nonupdate period. The time period is also divisible into two alternative components: an unstable period during which the time elements may not be stably read, and a stable period in which they are. The clock issues an update in progress (UIP) signal when it is in the update period. Using the UIP signal, the processor ascertains the start and duration of the stable period and reads time elements only during this period.

The present invention provides a program that uses a single routine to retrieve any of a number of values from the registers of an RTC clock, with little or no possibility of error. As programmed with the routine, which preferably is a portion of a basic input output system (BIOS), a processor reads the RTC in order to discern the present time. The processor takes advantage of an initial period of the RTC update cycle during which, in fact, the output registers of the RTC clock do not change and may be stably read. During the update cycle of the RTC, the RTC clock outputs an update-in-progress (UIP) signal. The program permits the processor to read time elements from the RTC when the UIP signal is clear, and further permits the reading of time elements from the RTC during an initial read window when the UIP signal is set. The processor uses an internal clock to determine when the read window of the update period is about to expire, and a read operation will not be begun if there is a danger that the read window will be exceeded.

According to another aspect of the invention, the processor uses a single read time routine that permits the reading of any of a number of predetermined time elements from the RTC clock during a period in which the output registers of the RTC are stable, but which otherwise prohibits such reads.

BRIEF DESCRIPTION OF THE DRAWINGS

Further aspects of the invention can be discerned from the following detailed description when read in conjunction with the drawings, wherein.

DETAILED DESCRIPTION OF ILLUSTRATED EMBODIMENT

Figure 1:
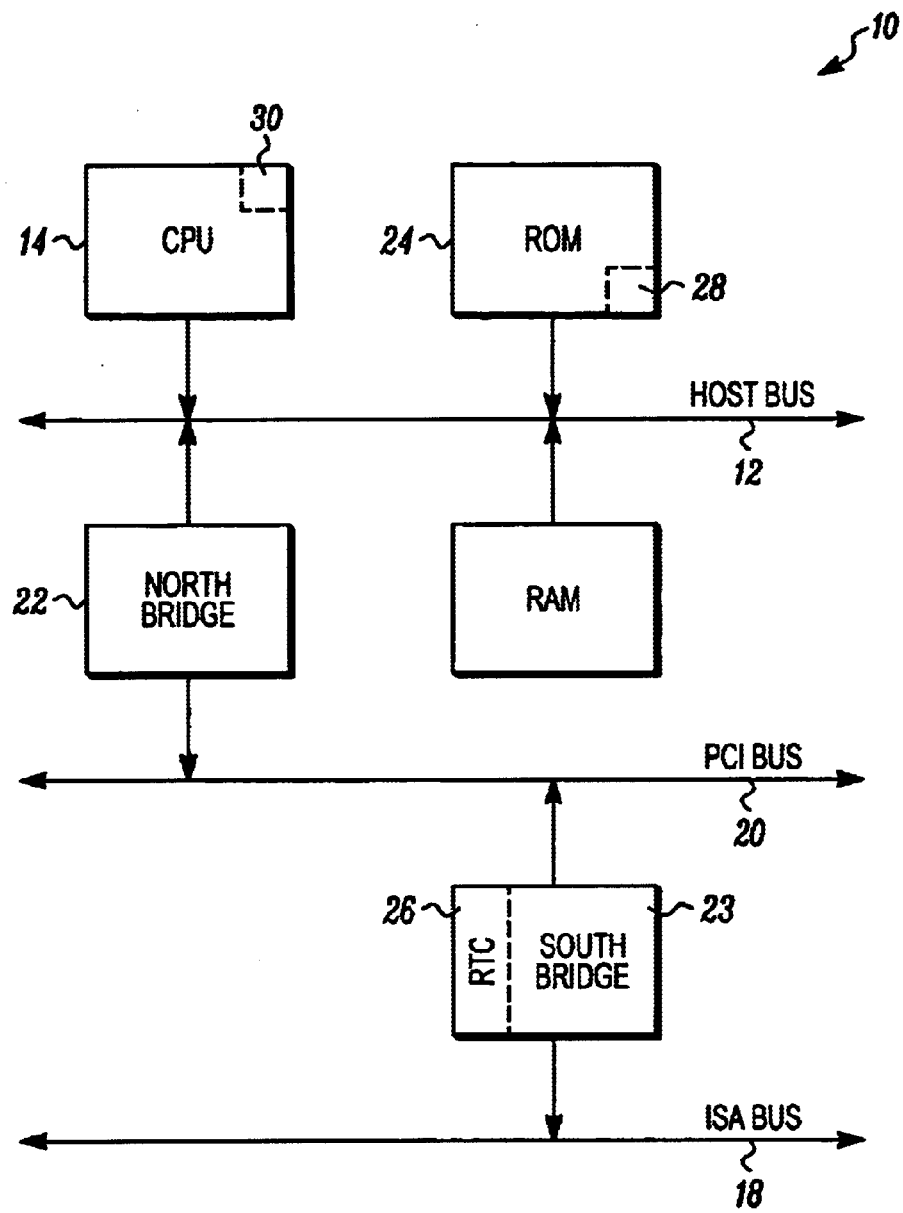
FIG. 1 is a high-level schematic and partial diagram of a personal computer (PC) architecture in which the invention can be employed.

Referring first to FIG. 1, a personal computer indicated generally at 10 has a variety of components interconnected by buses of various speeds and capabilities. A host or processor bus 12 runs at a relatively fast speed and is connected to relatively high-speed components, including a processor or CPU 14 and a random access memory (RAM) 16, such as SDRAM. A read-only memory (ROM) circuit 24 is also connected to the host bus 12. The ROM 24 includes a basic input output system (BIOS) portion 28 on which a BIOS program is stored; the BIOS configures the computer upon bootup. The computer 10 has other, slower buses and communications links, of which an ISA bus 18 and a PCI bus 20 are examples. In the illustrated, exemplary architecture, a "North bridge" 22 interconnects the host bus 12 with the PCI bus 20. A "South bridge" 23 connects the PCI bus 20 to the ISA bus 18. In the illustrated embodiment, a MOTOROLA RTC-compatible RTC 26 is made a part of the south bridge integrated circuit 23. In other embodiments, the RTC circuit 26 could be a separate chip or integrated with another component. An RTC reading routine (called READTIME) according to the invention is a small component of the much-larger BIOS 28.

Upon bootup the BIOS gets loaded into the volatile memory 16. The BIOS is used to program the processor 14 to perform various functions basic to the operation of the computer system, of which ascertaining the time and date is one.

The processor 14 includes a processor clock 30. The processor clock 30 does not have to be completely constant; it only has to be constant within the period of time that the READTIME routine 28 is executed. Thus, the invention is employable for those processors whose clocks vary according to whether they have been put into a cooldown period.

Most PCs include an RTC 26 which is compatible with the original such chip from MOTOROLA, which tracks the time of day, including seconds, minutes, hours and calendar information, all in BCD format. This clock is updated once per second.

Figure 2:
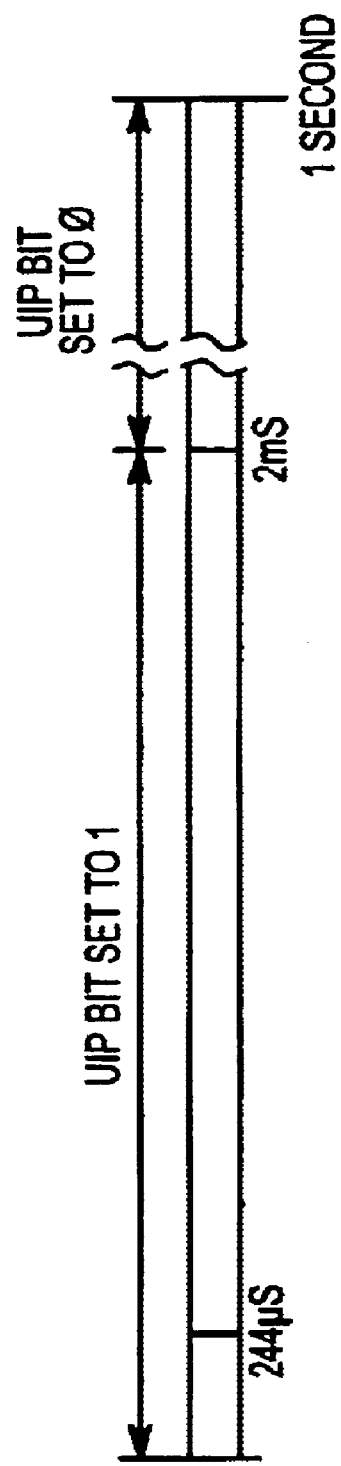
FIG. 2 is a time diagram showing a cycle of the real time clock (RTC) shown in FIG. 1.

The update cycle of a typical RTC clock is shown in FIG. 2. It takes at least 244 $\mu$S, and up to 2 ms, for the RTC clock 26 to perform an update. During most of this update period, reads or writes to the time can occur incorrectly. To correct this problem, the RTC clock 26 asserts an update-in-progress (UIP) bit which is readable at a stable data port, that is, the UIP bit can be read with certainty by the CPU 14 at any time.

During the first 244 $\mu$S of the period during which the UIP bit is set, the RTC clock 26 is in fact stably readable. This beginning period is analogous to a yellow traffic light, which indicates that one should not enter into an intersection, but provides a safety zone if one is already beyond the point of no return. The initial 244 $\mu$S period provides a safe read window between the time that the UIP bit is inspected and the time that the time element(s) (seconds, minutes, hours, day of the week, date, month, and/or year) is/are read.

The CPU can read any single time element correctly by using the UIP bit. First, the CPU reads the UIP bit. If the bit is set, CPU reads the UIP bit again, and this loop continues until the CPU discerns that the UIP bit is not set. If the bit is not set, the CPU reads the desired time element. As long as these steps take less than 244 $\mu$S to complete, the time element will be read correctly. Thus, read routines have been devised for inclusion in the BIOS which allow any single atomic time element to be read correctly. These conventional routines abstract the hardware-dependent UIP checking process, so that any piece of code which has to read a time element correctly can do so without supporting a hardware-dependent real time clock interface.

A problem occurs, however, when an entire set of time elements, such as hours, minutes and seconds, must be read in an instantaneously coherent manner. The read routine according to the invention extremely diminishes the chances of missing any critical read window without realizing the fact (and therefore returning one or more incorrect time elements).

The following pseudocode listing provides an apt description of a READTIME routine according to the invention which solves this problem:

TABLE

READTIME PSEUDOCODE LISTING

```
READTIME Routine (IndexStringPointer,
    OutputStringPointer,
ElementCount)
    START:
        Compute the number of CPU clock cycles within a
        predetermined period that is less than 244 µS. 230 µS is
        preferred.
        Store this value to ThresholdTicks.
        READSTARTTIME:
        Read the CPU time stamp counter. Store to StartTicks.
        READELEMENTS:
        IndexPointer = IndexStringPointer.
        OutputPointer = OutputStringPointer.
        LoopCount = ElementCount.
        ELEMENTLOOP:
        Call READRTC(Index) → (UIPFlag, Value)
        If UIPFlag = 1, goto READSTARTTIME.
        Store Value to time/date string.
        Increment IndexPointer and OutputPointer.
        Decrement LoopCount.
        Loop ELEMENTLOOP If LoopCount > 0
        Read the CPU time stamp counter. Store to EndTicks.
        TotalTicks = EndTicks − StartTicks.
        If TotalTicks > ThresholdTicks then
            Goto READSTARTTIME.
        End if
        READRTC Routine (Index) → (UIPFlag, Value)
        UIPFlag = 0.
        WaitUIPClear:
            Delay for 1 I/O cycle.
            Send index of register containing UIP bit to
                RTC index port.
            Delay for 1 I/O cycle.
            Read from RTC data port.
            If UIP bit is set then
                UIPFlag = 1.
                Goto WaitUIPClear.
            End if
            Delay for 1 I/O cycle.
            Send Index to RTC index port.
            Delay for 1 I/O cycle.
            Read Value from RTC data port.
            Return to caller.
        READRTC End
```

In the START section of the above READTIME routine, the period for which a number of CPU clock cycles is counted should be "comfortably" under the 244 $\mu$S initial read window, such as 230 $\mu$S. In environments where the clock speed remains constant at runtime, this value can simply be computed during boot (POST) and stored in the memory, such that it need not be computed each time. The ThresholdTicks value is used to determine whether enough time continues to exist for a valid read to occur. The ELEMENTLOOP segment compares ThresholdTicks to TotalTicks, or the total time which has elapsed since the routine has started (which in turn is computed from EndTicks—StartTicks). ELEMENTLOOP transfers control back to the READSTARTTIME routine if TotalTicks has been exceeded.

Where TotalTicks is still less than ThresholdTicks, the program proceeds to the READRTC routine, the first step of which is to set a UIP flag to zero. Within READRTC, the UIPFlag will change from zero to one if the UIP bit has been set; however, UIPFlag does not return to 0 until READRTC is initiated again. The program next enters a WaitUIPClear subroutine. The UIP bit is read from the RTC data port. If the UIP bit is set, meaning that the RTC clock is within its update period, the UIP flag is set to 1, and the algorithm returns to the beginning of WaitUIPClear, cycling until the UIP bit is sensed as no longer having been set. This means that the RTC clock has exited the update period and that the reading of a selected one of the RTC registers can proceed.

The READRTC routine returns a read time element, which is stored to a time/date string.

The READRTC routine also always sets the UIPFlag to zero, and changes this value only if it senses that the UIP bit of the RTC is set. Otherwise, the UIPFlag stays at zero. A "1" value of the UIPFlag will essentially restart the counter, whereas if the returned UIPFlag value is zero, the counter will continue to count toward its ThresholdTicks (230 $\mu$S) limit. This becomes important when the READTIME routine is called at a point toward the end of the one-second RTC cycle, during which the UIP Bit is still zero but less than 230 $\mu$S from the point that the RTC update period begins, at which time the UIP bit goes from zero to one. The program permits one or more time elements to be read within the initial 244 $\mu$S window of time during which the UIP bit is set but during which the RTC time element registers still present stable values.

In the preferred embodiment, StartTicks is read from a time stamp counter or clock inside a PENTIUM processor-compatible CPU 14. However, another clock could be used if it could be read in a single step and if it had sufficient precision and range to cover orders of magnitude considerably under 244 $\mu$S A time-of-day clock containing an equivalent of the UIP bit could also be substituted.

At several places in the above pseudocode, an I/O cycle day is used. This can be provided, for example, by performing a byte-wide write to a do-nothing port.

The present invention enables the BIOS to faithfully read the time and date, which is extremely important to mission-critical applications which rely on these values to execute sensitive financial, physical or other time-dependent operations. Even a rare error in reading these values, occurring because of an unmet timing deadline, could produce a result which could lead to false accounting records or unexpected embedded device failures. The present invention also permits the use of a single routine to execute an unlimited number of different, coherent read operations, thus saving firmware space.

It is believed that the time element read routine of the invention is the first to time a series of I/O transactions within the RTC in order to make certain that all of them fall within the critical time window. Further, the time element routine according to the invention is the first one which can be used for confidently reading any subset of the dynamic elements of the RTC.

While preferred embodiments of the present invention have been described and illustrated, the present invention is not limited thereto but only by the scope and spirit of the appended claims.

I claim:

1. A system for reliably ascertaining a plurality of different time elements, comprising:

a clock for calculating and storing a plurality of different time elements and making the time elements available to be read, the clock updating the time elements at the end of each of a plurality of time periods, each time period having a nonupdate period during which the time elements are not being changed and an update period during which the clock is updating the time elements, the clock generating a signal for the duration of the update period, wherein said update period further comprises a read window portion during which the time elements may be stably read; and a processor coupled to the clock for reading the signal and time elements, the processor programmed with a read time program which permits the reading of the time elements during the nonupdate period and during the read window portion but which prohibits the reading of time elements during that portion of the update period not falling within the read window portion, wherein said read window portion corresponds to a period of time between detection of said signal and reading of said time elements.

2. The system of claim 1, wherein each of the time periods is one second.

3. The system of claim 1, wherein the time elements include the time of day measured in hours, minutes and seconds.

4. The system of claim 3, wherein the time elements further include the month, day, year, and day of the week.

5. The system of claim 1, and further comprising a nonvolatile memory for storing the read time program, the nonvolatile memory being coupled to the processor.

6. The system of claim 5, wherein the nonvolatile memory is a BIOS memory component.

7. The system of claim 1, wherein the clock is a real time clock.

8. A system for reliably ascertaining a plurality of different time elements, comprising:

a clock for calculating and storing a plurality of different time elements and making the time elements available to be read, the clock updating the time elements once during each of a plurality of time periods, each time period having a nonupdate period during which the time elements are not updated by the clock and an update period during which the clock updates the time elements, said update period further including a non-stable period during which the time elements may not be stably read and a stable period during which the time elements may be stably read; and a processor coupled to the clock for selectively reading the time elements, the processor programmed with a single read time routine which permits the reading of the time elements during the stable period but prohibits the reading of the time elements during the nonstable period, wherein said stable period corresponds to a period of time between detection that the system is in the update period and reading said time elements.

9. The system of claim 8, wherein the time periods are successive seconds.

10. The system of claim 8, wherein the clock is a real time clock.

11. The system of claim 8, and further including a nonvolatile memory coupled to the processor for storing the read time routine.

12. The system of claim 11, wherein the nonvolatile memory is a BIOS memory component.

13. The system of claim 8, wherein the read time routine includes a clock reading portion which reads an update in progress (UIP) bit of the clock, the UIP bit having an updating state and a nonupdating state, the clock reading portion, upon reading an updating state of the UIP bit, waiting for the occurrence of the nonupdating state, the clock reading portion reading a time element if the UIP bit is in an nonupdating state.

14. The system of claim 8, wherein the read time routine includes a counter portion which reads a time counter of the processor and compares the value of the time counter to a start time count, the read time routine resetting the start time count and at least one time element pointer upon the value of the time counter exceeding the start time count by a predetermined value.

15. The system of claim 8, wherein the clock outputs an update in progress (UIP) signal having an updating state and a nonupdating state, the read time routine including a UIP reading portion which reads the UIP signal and sets a UIP flag upon ascertaining that the UIP signal is an updating state, the read routine reading a time counter of the processor to set a start time count, the read routine resetting the start time count and at least one time element pointer as a function of the UIP flag being set.

16. A system for reliably ascertaining a plurality of different time elements, comprising:
  a clock for calculating and storing a plurality of different time elements and making the time elements available to be read, the clock updating the time elements once during each of a plurality of time periods, each time period having an update period during which the clock is updating the time elements and a nonupdate period, each update period also divided into an unstable period during which the time elements may not be stably read and a stable period during which the time elements may be stably read, the clock generating a signal during the update period; and
  a processor coupled to the clock for reading the time elements and the signal, the processor programmed with a read time program which uses the signal to determine what state the clock is in and which directs the processor to read the time elements only during the stable period and the nonupdate period, said stable period corresponding to a period of time between detection of the signal and reading said time elements.

17. The system of claim 16, wherein the signal has a first value indicating that the clock is updating the time elements and a second value indicating that the clock is not updating the time elements, the processor using a change of the signal from the first value to the second value to reset a timer, the processor using the timer to ensure that the reading of the time elements occurs within the stable period.

18. The system of claim 16, and further comprising a nonvolatile memory coupled to the processor for storing the read time program.

19. The system of claim 18, wherein the nonvolatile memory is a ROM BIOS component.

20. The system of claim 16, wherein the clock is a real time clock.

21. A method for reliably ascertaining a plurality of different time elements from a time element generating clock coupled to a processor, comprising:
  using the clock, calculating and storing a plurality of different time elements and making the time elements available to be read;
  using the clock, updating the time elements at the end of each of a plurality of time periods, each time period having a nonupdate period during which the time elements are not being changed and an update period during which the clock is updating the time elements;
  using the clock, generating a signal, the signal having a first state during each update period and a second state during the nonupdate period, wherein said update period further includes a read window portion during which the time elements may be stably read;
  using the processor, reading the signal from the clock;
  reading selected ones of the time elements during the nonupdate period and the read window portion of the update period; and
  not reading any time element during that portion of the update period not falling within the read window portion, said read window portion corresponds to a period of time between said reading the signal and said reading the time elements.

22. The method of claim 21, and further comprising the steps of
  preselecting a counter period to be less than the period taken up by the read window portion;
  calculating the number of internal processor clock cycles occurring within the counter period; and
  using the number of internal processor clock cycles to provide a counter such that any reading of the time elements by the processor will not occur in the update period outside of the read window portion.

23. The method of claim 21, wherein the time elements include the time of day measured in hours, minutes and seconds.

24. The method of claim 23, wherein the time elements further include the month, day, year, and day of the week.

25. The method of claim 21, wherein the time element-generating clock is a real time clock.

26. A method for reliably ascertaining a plurality of different time elements by a processor, comprising:
  using a time element-generating clock coupled to the processor for calculating and storing a plurality of different time elements and making the time elements available to be read;
  using the clock, updating the time elements once during each of a plurality of time periods, each time period having a nonupdate period during which the time elements are not updated by the clock and an update period during which the clock updates the time elements, said update period further having a nonstable period during which the time elements may not be stably read and a stable period during which the time elements may be stably read;
  using the processor to selectively read one or more time elements during the stable period; and
  prohibiting the processor from reading any time element during the nonstable period, wherein said stable period corresponds to a period of time between detecting that the system is in the update period and reading said time elements.

27. The method of claim 26, wherein the clock is a real time clock.

28. The method of claim 26, and further comprising the steps of:
  using the clock to generate an update in progress (UIP) bit, the UIP bit having an updating state and a nonupdating state;
  using the processor to read the UIP bit;
  waiting for the occurrence of the nonupdating state of the UIP bit; and responsive to ascertaining the occurrence of the nonupdating state of the UIP bit, using the processor to read at least one of the time elements of the clock.

29. The method of claim 26, and further comprising the steps of:
   determining a pointer of a time element to be read from the clock by the processor;
   establishing a start time count;
   reading a time counter of the processor to obtain a current count;
   comparing the value of the current count to the start time count; and
   resetting the start time count and the time element pointer upon the value of the time counter exceeding the start time count by a predetermined value.

30. The method of claim 26, and further comprising the steps of:
   setting a time element parameter which corresponds to a time element which is desired to be read;
   using the clock to generate an update in progress (UIP) signal having an updating state and a nonupdating state;
   reading the UIP signal;
   setting a UIP flag upon ascertaining that the UIP signal is an updating state;
   reading a time counter of the processor to set a start time count; and
   resetting the start time count and at least one time element pointer as a function of the UIP flag being set.

31. A medium on which has been prerecorded a machine-readable computer program which is capable of programming a processor to:
   read a signal from a time element-generating clock coupled to the processor, the signal having a first state during an update period in which the clock is updating one or more time elements, the signal having a second state during a nonupdate period of the clock;
   read selected ones of the time elements during the nonupdate period and a read window portion of the update period during which the time elements of the clock may be stably read by the processor; and
   not read any time element during that portion of the update period not falling within the read window portion, said read window portion corresponds to a period of time between detecting the signal and reading said time elements.

32. The medium of claim 31, wherein the processor, as programmed by the computer program prerecorded on the medium, performs the following additional steps:
   preselecting a counter period to be less than the period taken up by the read window portion;
   calculating the number of internal processor clock cycles occurring within the counter period; and
   using the number of internal processor clock cycles to provide a counter such that any reading of the time elements by the processor will not occur in the update period outside of the read window portion.

33. The medium of claim 31, wherein the medium is an electrically programmable read only memory, an electrically erasable and programmable read only memory (EEPROM), or a "flash" EEPROM.

34. The medium of claim 31, wherein the prerecorded computer program is part of a basic input output system (BIOS).

35. The medium of claim 31, wherein the time element-generating clock is a real time clock.

36. A medium on which has been prerecorded a machine-readable computer program which is capable of programming a processor to:
   use a time element-generating clock coupled to the processor for calculating and storing a plurality of different time elements and making the time elements available to be read;
   using the clock, update the time elements once during each of a plurality of time periods, each time period having a nonupdate period during which the time elements are not updated by the clock and an update period during which the clock updates the time elements, said update period further having a nonstable period during which the time elements may not be stably read and a stable period during which the time elements may be stably read;
   read one or more time elements during one of the nonupdate period and the stable period; and
   forego from reading any time element during the nonstable period, wherein said stable period corresponds to a period of time between detecting that the system is in the update period and when the processor is able to read said time elements.

37. The medium of claim 36, wherein the time element clock generates and further comprising the steps of:
   an update in progress (UIP) bit, the UIP bit having an updating state and a nonupdating state, the processor further programmed by the prerecorded computer program to perform the following steps;
   reading the UIP bit;
   waiting for the occurrence of the nonupdating state of the UIP bit; and
   responsive to ascertaining the occurrence of the nonupdating state of the UIP bit, reading at least one of the time elements of the clock.

38. The medium of claim 36, wherein the processor is further programmed by the prerecorded computer program to perform the further steps of:
   determining a pointer of a time element to be read from the clock;
   establishing a start time count;
   reading a time counter of the processor to obtain a current count;
   comparing the value of the current count to the start time count; and
   resetting the start time count and the time element pointer upon the value of the time counter exceeding the start time count by a predetermined value.

39. The medium of claim 36, wherein the processor is further programmed by the prerecorded computer program to perform the following steps:
   setting a time element pointer which corresponds to a time element which is desired to be read from the time element clock, the time element clock generating an update in progress (UIP) signal having an updating state and a nonupdating state;
   reading the UIP signal;
   setting a UIP flag upon ascertaining that the UIP signal is an updating state;
   reading a time counter of the processor to set a start time count; and
   resetting the start time count and at least one time element pointer as a function of the UIP flag being set.

* * * * *